United States Patent
Nilsson et al.

(10) Patent No.: US 11,190,430 B2
(45) Date of Patent: Nov. 30, 2021

(54) DETERMINING THE BANDWIDTH OF A COMMUNICATION LINK

(71) Applicant: British Telecommunications Public Limited Company, London (GB)

(72) Inventors: Michael Nilsson, London (GB); Stephen Appleby, London (GB); Yousif Humeida, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 16/472,427

(22) PCT Filed: Dec. 13, 2017

(86) PCT No.: PCT/EP2017/082590
§ 371 (c)(1),
(2) Date: Jun. 21, 2019

(87) PCT Pub. No.: WO2018/114520
PCT Pub. Date: Jun. 28, 2018

(65) Prior Publication Data
US 2019/0363963 A1 Nov. 28, 2019

(30) Foreign Application Priority Data
Dec. 21, 2016 (EP) .................................. 16205777

(51) Int. Cl.
*H04L 25/03* (2006.01)
*H04L 12/26* (2006.01)
(Continued)

(52) U.S. Cl.
CPC ...... *H04L 43/0882* (2013.01); *H04L 43/0841* (2013.01); *H04L 43/0888* (2013.01); *H04L 47/25* (2013.01); *H04L 47/283* (2013.01)

(58) Field of Classification Search
None
See application file for complete search history.

(56) References Cited

U.S. PATENT DOCUMENTS 6,925,502 B1    8/2005  Abbasi et al.
8,169,914 B2 *  5/2012  Bajpai .................. H04L 1/1628
                                                    370/236
(Continued)

FOREIGN PATENT DOCUMENTS

EP    1578070 A1    9/2005
EP    2053799 A1    4/2009
(Continued)

OTHER PUBLICATIONS

Application and Filing Receipt for U.S. Appl. No. 16/473,784, filed Jun. 26, 2019, Inventor(s): Nilsson et al.
(Continued)

*Primary Examiner* — Brandon M Renner
(74) *Attorney, Agent, or Firm* — Patterson Thuente Pedersen, P.A.

(57) ABSTRACT

A method of determining the bandwidth of a link carrying a plurality of data streams between a plurality of sources and a plurality of destinations in a network, the method including sending data packets from a first data stream over the link from one source to one destination at a first transmission rate, and measuring an associated first packet loss rate; sending further data packets from the first data stream over the link from the one source to the one destination at a second transmission rate, and measuring an associated second packet loss rate; and determining the bandwidth of the link in dependence on the first and second packet loss rates and the first and second transmission rates.

14 Claims, 4 Drawing Sheets

(51) Int. Cl.
*H04L 12/825* (2013.01)
*H04L 12/841* (2013.01)

(56) References Cited

U.S. PATENT DOCUMENTS

| | | | |
|---|---|---|---|
| 10,326,677 B2* | 6/2019 | Suzuki | H04L 43/0876 |
| 2002/0001093 A1 | 1/2002 | Zhang et al. | |
| 2003/0179719 A1 | 9/2003 | Kobayashi et al. | |
| 2004/0044761 A1 | 3/2004 | Phillipi et al. | |
| 2004/0215746 A1 | 10/2004 | McCanne et al. | |
| 2005/0083841 A1* | 4/2005 | Zuberi | H04L 47/822 |
| | | | 370/230 |
| 2005/0259577 A1 | 11/2005 | Sin | |
| 2007/0064596 A1* | 3/2007 | Jung | H04L 47/14 |
| | | | 370/229 |
| 2009/0285211 A1* | 11/2009 | Muramoto | H04L 45/00 |
| | | | 370/390 |
| 2009/0323679 A1* | 12/2009 | Anandakumar | H04L 43/0829 |
| | | | 370/352 |
| 2011/0083035 A1* | 4/2011 | Liu | H04L 1/1848 |
| | | | 714/4.1 |
| 2011/0261691 A1 | 10/2011 | Jin et al. | |
| 2013/0163667 A1 | 6/2013 | Nilsson et al. | |
| 2013/0297743 A1 | 11/2013 | Eschet et al. | |
| 2014/0032781 A1 | 1/2014 | Casey et al. | |
| 2014/0282792 A1 | 9/2014 | Bao et al. | |
| 2014/0297813 A1 | 10/2014 | Gomes et al. | |
| 2016/0007263 A1 | 3/2016 | Gholmieh et al. | |
| 2016/0080241 A1* | 3/2016 | Rocha De Maria | ............... |
| | | | H04L 43/0888 |
| | | | 370/252 |
| 2016/0218892 A1* | 7/2016 | Lida | H04L 25/03305 |

FOREIGN PATENT DOCUMENTS

| | | |
|---|---|---|
| EP | 1463228 B1 | 12/2012 |
| EP | 2928145 A1 | 10/2015 |
| GB | 2516112 A | 1/2015 |
| JP | 2008278207 A | 11/2008 |
| WO | WO 2018114519 A1 | 6/2018 |
| WO | WO2018121990 A1 | 7/2018 |

OTHER PUBLICATIONS

Application and Filing Receipt for U.S. Appl. No. 16/472,394, filed Jun. 21, 2019, Inventor(s): Nilsson et al.
International Search Report and Written Opinion for Application No. PCT/EP2017/082671, filed Dec. 13, 2017, dated Feb. 23, 2018 (10 Pgs).
Extended European Search Report for Application No. 16205772.3, dated Jun. 30, 2017 (7 pgs).
GB Search Report for Application No. 1621854.7, dated Jun. 7, 2017 (1 pg).
International Search Report for Application No. PCT/EP2017/082589, dated Apr. 13, 2018 (5 pgs).
UC Berkeley student project, 2005, "A comparative analysis of TCP Tahoe, Reno, New-Reno, SACK and Vegas," Obtained from: [http://inst.eecs.berkeley.edu/~ee122/fa05/projects/Project2/SACKRENEVEGAS] (7 Pgs).
European Search Report for Application No. EP 16 20 5777, dated Apr. 18, 2017 (9 pgs).
Great Britain Search Report for Application No. GB 1621855.4, dated Apr. 27, 2017 (5 pgs).
International Search Report for Application No. PCTZEP2017/082590, dated Feb. 21, 2018 (3 pgs).
Communication pursuant to Article 94(3) EPC for Application No. 17828674.6, dated Sep. 16, 2020, 12 pages.
International Preliminary Report on Patentability for Application No. PCT/EP2017/082590, dated Jul. 4, 2019, 10 pages.

* cited by examiner

DETERMINING THE BANDWIDTH OF A COMMUNICATION LINK

CROSS-REFERENCE TO RELATED APPLICATION

The present application is a National Phase entry of PCT Application No. PCT/EP2017/082590, filed Dec. 13, 2017, which claims priority from European Patent Application No. 16205777.2 filed Dec. 21, 2016, each of which is fully incorporated herein by reference.

TECHNICAL FIELD

The present disclosure relates to a technique for determining the bandwidth of a communication link within a network. In particular, the present disclosure relates to a technique for determining the bandwidth of a communication link that carries a plurality of data streams.

BACKGROUND

The demands on communication networks continue to grow as increasing numbers of devices are provided with network connectivity. For example, it is now common for devices such as smartphones, laptops, PCs, tablets, set-top boxes, smart TVs and smartwatches to be capable of connecting to the internet. As well as increasing numbers of devices with network connectivity, the data demands of the devices themselves continue to increase. For instance, it is not uncommon for users to wish to perform data-intensive activities such as conducting video calls, streaming TV and video content or playing online computer games directly over the internet.

The increasing levels of network traffic often lead to regions of congestion within a network. Congestion can occur when the level of traffic through a communication link of the network exceeds, or approaches, the bandwidth of that link. As such, it is common for a network to implement congestion and/or traffic control measures. Some classes of congestion control arise from the nature of the protocols used to support the communications over a network. Communications over the internet, for example, utilize the TCP protocol. One of the principles of TCP is that the transmission rate over a particular connection is controlled in response to detected packet losses so as to be fair to neighboring competing traffic. The congestion control mechanisms of TCP operate on the principle, or assumption, that a packet loss is due to congestion in the network, and so by reducing the packet transmission rate in response to a packet loss, TCP aims to reduce the congestion contributed by a particular connection over the network.

Whilst congestion control mechanisms (such as those implemented over TCP connections) may be implemented by individual devices within the network, traffic management schemes are typically implemented by operators of a network, such as internet service providers (ISPs). Traffic management schemes may prioritize certain types of network traffic over others. This may be done by allocating a greater proportion of the available bandwidth of the network to certain types of traffic over other types of traffic. For example, a traffic management scheme may allocate a greater percentage of the available network bandwidth to audio and video streaming services compared to web browsing traffic, or file sharing traffic.

One problem with traffic management schemes is that they may be complex and time consuming for the ISPs to implement. This problem may be exacerbated by the fact that traffic management schemes are typically not static but vary in time depending on the traffic demands being placed on the network. It may therefore be desirable to manage the network traffic in another way.

However, in order to effectively manage network traffic, it is desirable to know the bandwidth of the network, or at least the bottleneck bandwidth (that is, the lowest bandwidth a communication link between a data source and data destination in a network). Outside of the ISPs, it may be difficult to know the bandwidth of a link within a network. This is because many devices (e.g. those implementing TCP) communicate in an end-to-end manner meaning that the location of the bottleneck within the network may be transparent to the devices. Though a reasonable model is to assume that each TCP connection over a link consumes an equal amount of the available bandwidth, it is typically not known outside of the ISPs how many devices have established a TCP connection over the link, and therefore the available bandwidth of the link cannot readily be determined.

SUMMARY

There is therefore a need to determine the bandwidth of a link within a network.

According to one aspect of the present disclosure there is provided: a method of determining the bandwidth of a link carrying a plurality of data streams between a plurality of sources and a plurality of destinations in a network, the method comprising:

i) sending data packets from a first data stream over the link from one source to one destination at a first transmission rate, and measuring an associated first packet loss rate;

ii) sending further data packets from the first data stream over the link from the one source to the one destination at a second transmission rate, and measuring an associated second packet loss rate; and iii) determining the bandwidth of the link in dependence on the first and second packet loss rates and the first and second transmission rates.

The first data stream may comprise a plurality of temporal segments, and the data packets sent over the link at the first transmission rate may be from a first segment, and the data packets sent over the link at the second transmission rate may be from a second segment.

Determining the bandwidth of the link may comprise: identifying a first expression for the bandwidth as a function of the first transmission rate and associated first packet loss rate; identifying a second expression for the bandwidth as a function of the second transmission rate and associated second packet loss rate; and determining the bandwidth of the link from the first and second identified expressions.

The first and second identified expressions of the bandwidths may further be functions of the number of streams carried by the link.

The first expression of the bandwidth, $B_{e1}$ may be given by $$B_{e1} = Tr(1) + \frac{\sqrt{3}\, sN_s}{R\sqrt{2PLR(1)}},$$

and the second expression of the bandwidth, $B_{e2}$ may be given by $$B_{e2} = Tr(2) + \frac{\sqrt{3} \, s N_s}{R\sqrt{2PLR(2)}},$$

where Tr(1) is the first transmission rate, Tr(2) is the second transmission rate, PLR(1) is the first packet loss rate, PLR(2) is the second packet loss rate, s is the size of a packet, $N_s$ is the number of competing streams carried by the link and R is the round trip time.

The method further may comprise controlling the transmission rate of the data packets of the first data stream to be no more than a specified amount of the determined bandwidth of the link.

The bandwidth of the link may be determined in dependence only on the first and second packet loss rates and the first and second transmission rates.

The method may further comprise: sending data packets from the first data stream over the link at three or more transmission rates, and measuring an associated packet loss rate for each transmission rate; and determining the bandwidth of the link in dependence on the three or more transmission rates and the associated packet loss rates.

The bandwidth of the link may be determined from the three or more transmission rates and associated packet loss rates using a method of least squares applied to the expressions of bandwidth.

Each of the plurality of data streams may be TCP data streams.

According to a second aspect of the present disclosure there is provided a source node configured to transmit a first data stream over a link to a destination node in a network, the link carrying a plurality of data streams, the source node comprising: a dispatch unit configured to send data packets from the first data stream over the link at a first transmission rate, and to send further data packets from the first stream over the link at a second transmission rate; a packet loss detector configured to measure a first packet loss rate associated with the first transmission rate and a second packet loss rate associated with the second transmission rate; and a bandwidth calculator configured to determine the bandwidth of the link in dependence on the first and second packet loss rates and the first and second transmission rates.

According to a third aspect of the present disclosure there is provided a destination node configured to receive a first data stream over a link from a source node in a network, the link carrying a plurality of data streams, the destination node comprising: an input interface configured to receive data packets from the first data stream over the link at a first transmission rate, and to receive further data packets from the first stream over the link at a second transmission rate; a packet loss detector configured to measure a first packet loss rate associated with the first transmission rate and a second packet loss rate associated with the second transmission rate; and a bandwidth calculator configured to determine the bandwidth of the link in dependence on the first and second packet loss rates and the first and second transmission rates.

BRIEF DESCRIPTION OF THE DRAWINGS

The present disclosure will now be described by way of example with reference to the accompanying drawings. In the drawings.

DETAILED DESCRIPTION

The present disclosure is directed to a method and apparatus for determining the bandwidth of a link carrying a plurality of data streams between a plurality of sources and a plurality of destinations in a network. The bandwidth of the link is determined by first sending data packets from one of the data streams between one source and one destination over the link at a plurality of different transmission rates and measuring an associated packet loss rate for each transmission rate. The number of transmission rates (and associated packet loss rates) could be two or more. It has been realized that the bandwidth of the link can be expressed as a function of the transmission rate and the packet loss rate. By using multiple measurements of the transmission rate and associated packet loss rates, the bandwidth of the link can be determined. The examples described herein enable the bandwidth of the link to be determined without knowledge of the total number of data streams being supported by the link. This is convenient because it enables a node of the network (e.g. a node that transmits or receives data packets from a data stream over the link) to determine the link bandwidth without requiring any knowledge of the number of other data streams being supported by the link, which may be streams communicated to or from other nodes of the network.

Obtaining a value of the link bandwidth may be useful for a variety of reasons. For example, the node at which the link bandwidth is determined could be a content server configured to deliver media content over the network to one or more content clients. The content server could deliver this media content as part of a streaming session. By obtaining a value of the link bandwidth, the content server may limit the transmission rate of data packets for certain types of data (e.g. video data) to a specified proportion of the link bandwidth. This may be done to reserve a proportion of the bandwidth for the transmission of data packets supporting other applications, such as web browsing or file sharing. These other applications could be provided by the same content server or another content server of the network.

Example embodiments of the present disclosure will now be described.

Figure 1:
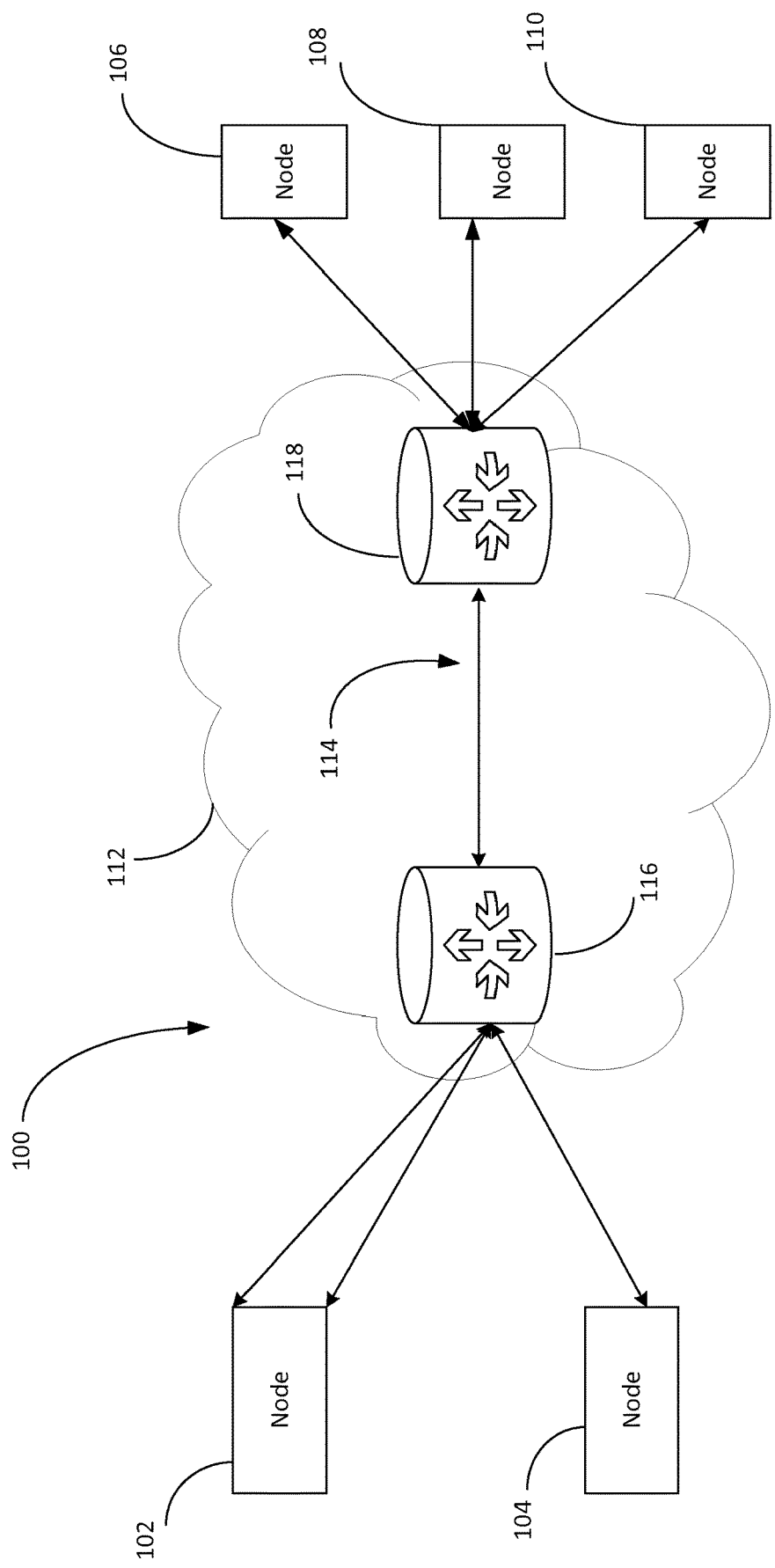
FIG. 1 shows an example of a communication system.

FIG. 1 shows an example of a communication system 100. The communication system comprises a plurality of nodes 102, 104, 106, 108 and 110. Nodes 102 and 104 are separated from nodes 106 to 110 by communication network 112. Nodes 102 and 104 are configured to deliver data packets forming a data stream to the nodes 106 to 110 over the network 112. One or more of these data streams could be TCP data streams (that is, a data stream formed from data packets transmitted in accordance with a TCP protocol). Node 102 transmits data packets forming two separate data streams over the network 112. Each of these data streams may be supporting a separate application, for example video streaming and web browsing. Node 104 is shown as transmitting data packets for a single data stream.

Since nodes 102 and 104 are—in the context of the system shown in FIG. 1—transmitting data packets over the network 112 (i.e. they are the source of the data packets), they may be referred to as source nodes, or transmitting nodes. Nodes 106 to 110 operate to receive the data packets delivered over the network and so may be referred to as destination nodes, or receiver nodes. It is noted that the terms "source" and "destination" are used herein as relative terms to refer respectively to transmitting and receiving nodes within the context of an example network connection illustrated for the purposes of clarity. These terms are not being used as fixed terms to imply a constraint on the functional capabilities of the nodes. For example, a source node may equally be capable of receiving data packets from another node in the network, and a destination node may equally be capable of transmitting data packets to another node over the network.

The communication network is shown as comprising a communication link, denoted generally at 114. The communication link 114 connects a pair of network routers 116 and 118. Nodes 102 and 104 are configured to deliver data packets forming three separate data streams to the router 116. Those data packets received by the router 116 are then communicated to router 118 over the link 114. Link 114 therefore carries the plurality of data streams (in this example, three) to be communicated between the two source nodes 102 and 104 to the three destination nodes 106 to 110. Router 118 receives the data packets delivered over link 114. The router 118 then transmits the data packets from a respective data stream to each of the destination nodes 106, 108 and 110 so that each destination node receives a respective data stream.

Link 114 is an example of a bottleneck link in the communication path between the source nodes and destination nodes. In the example shown here, the bottleneck link 114 carries each data stream transmitted from the source nodes; that is, the data packets for each of the plurality of data streams transmitted from the source nodes are transmitted over the bottleneck link 114.

Though only one link is shown forming part of the network 112 separating the source and destination nodes, it will be appreciated that in other examples the communication path through the network 112 between a source node and destination node may be formed of multiple communication links. Only one such link has been shown in FIG. 1 for the purposes of clarity and illustration. Further, though FIG. 1 shows two source nodes and three destination nodes, it will be appreciated that a communication system may contain any suitable number of source and destination nodes. In general, the communication system may comprise N source nodes and M destination nodes, where N=M or N≠M. There could be a greater number of source nodes than destination nodes (i.e. N>M) or a greater number of destination nodes than source nodes (i.e. M>N). Each source node may transmit data packets from one or more data streams. For example, a source node in the form of a content server may transmit data packets for multiple data streams each supporting different media content, such as video content and radio content. In general, each source node n in the set of N nodes may transmit data packets from $s_n$ streams, where $s_n \geq 1$. In addition, each destination node may receive data packets for one or more data streams. For example, a destination node in the form of a PC may receive data packets for a data stream supporting video content and a data stream supporting a download session. In general, each destination node m in the set of M nodes may receive data packets for $r_m$ streams, where $r_m \geq 1$.

Described below are methods of calculating the bandwidth of the communication link 114. Any one of the source nodes or destination modes may be configured to calculate the bandwidth of the communication link 114. It will be appreciated that for a given source and destination node pair (i.e., a source and destination node that exchange data packets over the network), only one of them need be able to determine the bandwidth of the link 114. For completeness, the operation of both a source node and a destination node when determining the bandwidth of link 114 will be described herein.

Figure 2:
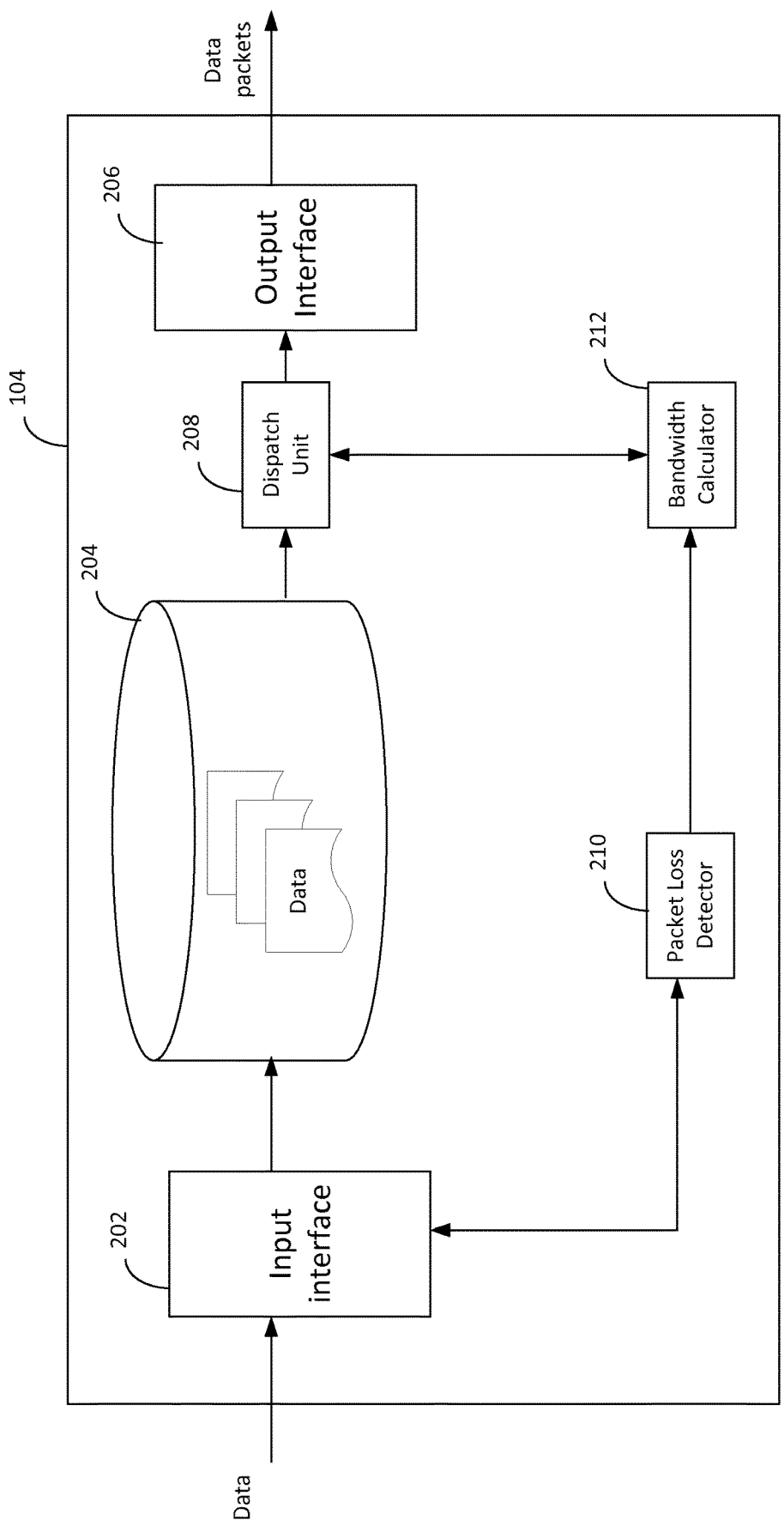
FIG. 2 shows an example of a network node in the communication system of FIG. 1.

An example of a source node configured to calculate the bandwidth of the communication link is shown in FIG. 2. In this example, the source node depicted is node 104 for the purpose of illustration.

The node 104 comprises an input interface 202; a data store 204 and an output interface 206. The node further comprises a dispatch unit 208, packet loss detector 210 and bandwidth calculator 212. The input interface 202 is shown coupled to the data store 204. The data store 204 is coupled to the dispatch unit 208 which is also coupled to the output interface 206. The dispatch unit 208 is further coupled to the bandwidth calculator 212, with the bandwidth calculator additionally being coupled to the packet loss detector 210.

The data store 204 stores data for delivering over the network 112. The data stored in the store 204 could comprise media content data (e.g. audio and/or video data), web browsing data, file download data, email data etc. The node 104 may receive the data for transmission over the network 112 from an external content generator (not shown in FIG. 1). The node 104 may receive this data via the input interface 202 and store the received data in the data store 204. In an alternative configuration, the data for transmission over the network 112 may be generated internally of the node 104. The data may be stored in the data store 204 in constituent blocks, or units. For example, certain types of data (e.g. video and/or audio content to be delivered as part of a streaming session) may be stored as a series of temporal segments, where each temporal segment contains data for a specified amount of playout time (e.g. 2 to 15 seconds). The data store 204 may store the data in an encoded form. The encoding may be performed by the node 104 by an encoder (not shown). Alternatively, the node may receive the data in encoded form from the external content generator.

Data from the data store 204 is passed to the dispatch unit 208, which operates to transmit the data from the node 104 via the output interface 206. The dispatch unit may operate to transmit the data in form of a series, or sequence, of data packets. The data packets may be transmitted in accordance with a TCP protocol. The sequence of data packets forms a data stream. If the data packets are TCP packets, the data stream formed is a TCP data stream. A data stream may be formed from a series of data packets containing data of a single type, or from data packets supporting a single application. Thus, the dispatch unit 208 may transmit data packets forming a single data stream, or multiple data streams. For example, the dispatch unit 208 may transmit a series of video data packets forming a video stream, and a series of audio packets forming an audio stream. As another example, the dispatch unit 208 may transmit a series of video packets forming a video stream as part of a video streaming session, and a series of data packets forming another data stream for supporting a web-browsing session. The dispatch unit 208 may generate the data packets from the data received from the data store 204. The dispatch unit may generate multiple data packets from one constituent block or unit of data stored in the data store.

Figure 4:
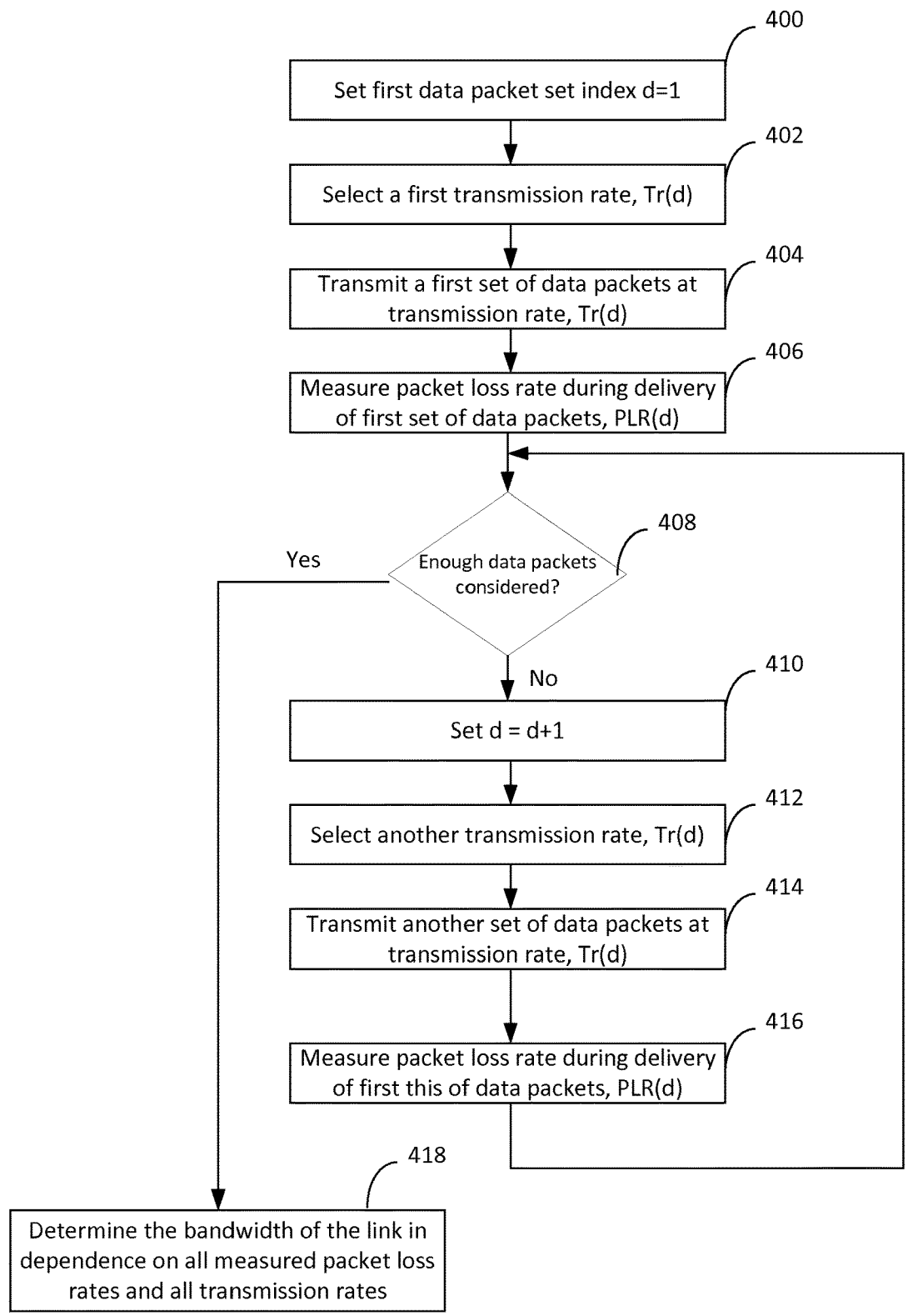
FIG. 4 shows a flowchart for determining the bandwidth of a link between a data source and a data destination within a network.

The packet loss detector 210 and bandwidth calculator 212 operate to calculate the bandwidth of the link 114, and will be described in more detail below with reference to FIG. 4.

Figure 3:
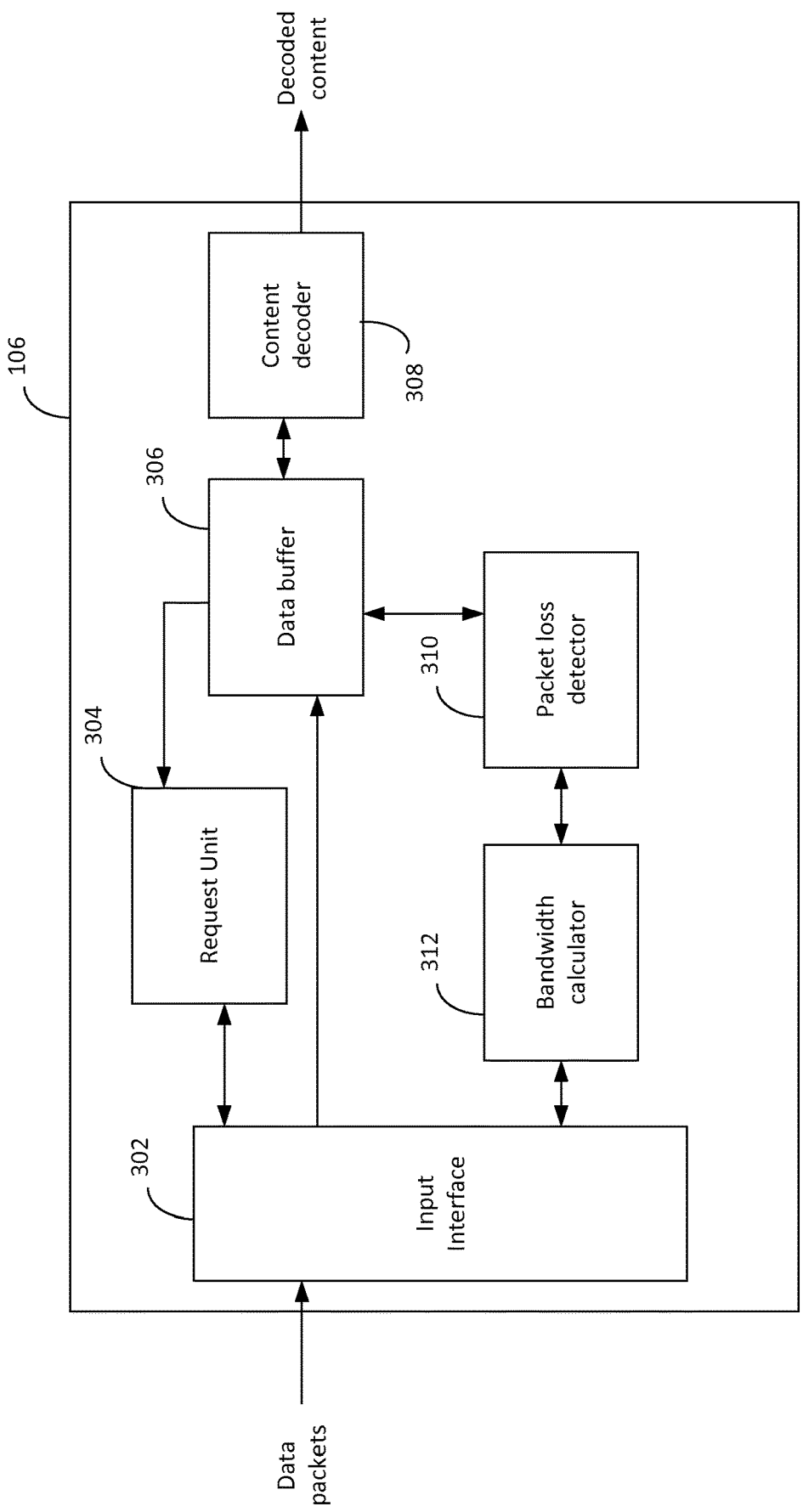
FIG. 3 shows another example of a network node in the communication system of FIG. 1.

An example of a destination node configured to calculate the bandwidth of link 114 is shown in FIG. 3. For the purposes of illustration only, the destination node shown in more detail is node 106.

The node 106 comprises an input interface 302 configured to receive data packets transmitted over the network 112 (and thus delivered via link 114) from one or more of the source nodes. Data packets received via the input interface 302 are input into a data buffer 306. The data buffer may store received data packets until a suitable time for playout to a user. Data stored in the buffer 306 is communicated to a content decoder 308. The decoder 308 operates to decode the received data packets for output to a user. The content decoder could comprise a video decoder and audio decoder, for example.

The destination node may optionally additionally comprise a request unit 304. The request unit may operate to request data, or content, from a source node. The request unit 304 may generate a data request message and cause the request message to be transmitted to a source node via the interface 302. For example, if the source and destination nodes operated according an HTTP Adaptive Bit Rate Delivery protocol, the node 106 may send media content requests to a source node in the form of an HTTP GET request.

The node 106 further comprises a packet loss detector 310 and bandwidth calculator 312. The packet loss detector is coupled to both the data buffer 310 and bandwidth calculator 312. The bandwidth calculator is additionally coupled to the interface 302. The packet loss detector and the bandwidth calculator operate to determine the bandwidth of the communication link 114, and will be described in more detail below.

The operation of both the source node 104 and the destination node 106 when calculating the bandwidth of the link 114 will now be described with reference to the flowchart in FIG. 4. In this example, source node 104 and destination node 106 form a node pair; i.e. source node 104 is delivering data packets over the network 112 to destination node 106.

At 400, the data packet set index 'd' is set to '1' to refer to a first set of data packets.

At 402, a first transmission rate is selected for transmitting the first set of data packets. The first transmission rate for a general set of data packets d is denoted Tr(d). Thus the transmission rate for the first set of data packets is denoted Tr(1).

The first transmission rate may be selected by the dispatch unit 208 of the source node 104. The transmission rate may be selected in dependence on network conditions and/or in dependence on a data request from a destination node (which in this example would be node 106). The network conditions may influence the selected transmission rate by virtue of a congestion control mechanism implemented by the source node 104. For instance, packet loss rates during recent periods of transmission may result in a lower transmission rate being selected. If the destination node sends a data request to the source node, this too may constitute a factor used to select the transmission rate Tr(d). For example, the selected transmission rate Tr(d) may be dependent on the bit rate (i.e. the quality) at which data requested by the destination node is encoded. A request for data encoded at a higher bit rate may result in a higher transmission rate being selected. The selected transmission rate Tr(d) may also be dependent on a specified time by which a segment of data is to be delivered to the destination node. This time interval may be specified by the destination node as part of the data request, or determined by the source node.

At 404, the source node 104 transmits a first set of data packets at the selected first transmission rate Tr(1) for delivery over the network to destination node 106. The first set of data packets form part of a first data stream. The source node may transmit a predetermined or specified number of data packets at the first transmitted rate, or may transmit the data packets at the first transmission rate for a predetermined or specified amount of time.

At 406, the packet loss rate during the delivery of the first set of data packets is measured. The packet loss rate for a general set of data packets d is denoted PLR(d). Thus, the packet loss rate for the delivery of the first set of data packets is denoted PLR(1). Since the first set of data packets were transmitted for delivery at a first transmission rate, the first packet loss rate PLR(1) may be said to be associated with the first transmission rate.

The packet loss rate may be measured by the packet loss detector 210 of the source node 104 or the packet loss detector 310 of the destination node 106.

Packet loss detectors 210 and 310 may be configured to detect each packet loss. Detectors 210 and 310 may operate in slightly different ways to detect a packet loss. For instance, the packet loss detector 210 may detect that a packet loss has occurred in response to an observation of certain indicative events, such as the receipt of duplicate acknowledgements from the destination node (that is, acknowledgement messages that contain the same sequence number), or the expiration of a packet re-transmission timer (known as a 'timeout'). A packet re-transmission timer may be stored at the source node 104 and be initiated in response to sending a packet. The timer may specify a time by which the source node is to receive an acknowledgement of the packet from the destination node before the packet is deemed lost and re-transmitted.

Packet loss detector 310 may detect that a packet loss has occurred from an inspection of sequence numbers associated with each received data packet. For instance, the detector 310 may determine that a packet loss has occurred if it detects a gap in the sequence numbers of received packets. The sequence numbers of the received data packets may be stored within the node 106, for example in the data buffer 306 or some other data store.

Both packet loss detectors 210 and 310 may be configured to store a record indicating when each packet loss during the delivery of the first set of data packets occurred. For example, the record may include, for each detected packet loss, a parameter indicative of when that loss occurred. That parameter could be a temporal value, a packet number or some other parameter. The packet loss detectors 210 and 310 may be configured to populate the record during the delivery of the first set of data packets as each packet loss is detected.

The packet loss rate PLR(d) may be defined in terms of the number of packets lost per specified number of packets sent. Thus, the detectors 210 and 310 may calculate the packet loss rate from the measured number of packet losses during delivery of the first set of data packets, and the number of data packets in the first set (i.e. the number of data packets transmitted at the first transmission rate).

At 408, it is determined whether a sufficient number of data packet sets have been considered in order for the bandwidth of the link 114 to be determined. This determination may be made by the bandwidth calculators 212 and 312. If a sufficient number of data sets have been considered, then the process proceeds to 418 and the bandwidth of the link is calculated. If a sufficient number of data packet sets have not yet been considered, the process proceeds to 410. As will be seen below, at least two sets of data packets transmitted at different transmission rates are needed to calculate the bandwidth of the link 114, and so continuing the present example the process proceeds to 410.

At 410 the data packet set index, d, is incremented by one so that d is set to the value of d+1. Continuing the present example, the data packet set index is incremented to '2'. The process then proceeds to 412.

At 412, a second transmission rate Tr(2) is selected. The second transmission rate Tr(2) is to be used for transmitting a second set of data packets. This transmission rate may be selected by the dispatch unit 208 of the source node 104. The second transmission rate may be selected in dependence on the same factors as those described above with reference to 402. If the second transmission rate is selected in dependence on the network conditions, then the second transmission rate may be selected in dependence on the measured packet loss rate PLR(1) during the delivery of the first set of data packets as determined at 406.

At 414, the source node 104 transmits a second set of data packets at the selected second transmission rate Tr(2) for delivery over the network to the destination node 106. This second set of data packets also forms part of the first data stream. That is, both the first and second sets of data packets form part of the first data stream. For example, the data packets of the second set may contain the same type of data (e.g. video data, audio data etc.), and/or data belonging to the same communication session (e.g. a streaming session), as the first set of data packets.

At 416, the packet loss rate during the delivery of the second set of data packets is measured. The packet loss rate for the delivery of the second set of data packets is denoted PLR(2). Since the second set of data packets were transmitted for delivery at the second transmission rate, the second packet loss rate PLR(2) may be said to be associated with the second transmission rate.

As described above with respect to the first packet loss rate, the second packet loss rate may be measured by the packet loss detector 210 of the source node or the packet loss detector 310 of the destination node. Both packet loss detectors 210 and 310 may operate to determine the second packet loss rate PLR(2) associated with the second transmission rate Tr(2) in the same way as described above with reference to 406.

Once the second packet loss rate has been determined, the process returns to 408, where it is again determined whether a sufficient number of data packet sets have been determined to enable the bandwidth of link 114 to be calculated. In this example, the consideration of two sets of data packets is sufficient to determine the bandwidth of the link, and so the process proceeds to 418.

At 418, the bandwidth of the link 114 is determined in dependence on all of the transmission rates for the transmitted data packet sets and all of the associated measured packet loss rates.

In the present example, data packets have been sent at two transmission rates, with a respective packet loss rate being determined for each transmission rate. Thus, at 418 the bandwidth of the link is determined in dependence on two transmission rates and two packet loss rates (each packet loss rate being associated with a respective transmission rate).

The bandwidth of the link 114 can be calculated by the bandwidth calculator 212 or the bandwidth calculator 312. Both calculators may operate to calculate the bandwidth in the same way. The examples below will be described with reference to the calculator 212 of the source node 104, but it will be appreciated that the following applies equally to the calculator 312 of destination node 106.

To calculate the bandwidth of link 114, the bandwidth calculator 212 identifies a first expression for the bandwidth as a function of the first transmission rate and the associated first packet loss rate, and identifies a second expression for the bandwidth of the link as a function of the second transmission rate and the associated second packet loss rate. The bandwidth of the link is then determined from the identified expressions.

To arrive at these identified expressions for the bandwidth, it is assumed that the majority of the competing traffic communicated over link 114 is TCP traffic, i.e. data packets communicated according to a TCP protocol. In other words, the majority (or all) of the competing data streams carried by the link 114—i.e., the data streams competing with the first data stream—are assumed to be TCP data streams. Under this assumption, and the further assumption that each competing TCP data stream is in the congestion avoidance phase, the bit rate of each competing data stream carried by the link 114 can be estimated as:

$$T \approx \frac{\sqrt{3}\,s}{R\sqrt{2p}} \quad (1)$$

where T is the bit rate (i.e. transmission rate) of the competing data stream in Mbit/s, s is the data packet size in bits, R is the round trip time in μs (that is, the time interval between the transmission of a data packet from the source node to a destination node to the time of receipt at the source node of an acknowledgement of receipt from the destination node), and p is the packet loss rate for the competing data stream.

If the bandwidth of the link 114 is B, and the transmission rate of the first data stream is Tr(d), and there are $N_s$ competing data streams being carried over link 114 (i.e. $N_s$ data streams in addition to the first data stream), then the bit rate of each competing data stream can also be estimated as:

$$T = \frac{B - Tr(d)}{N_s} \quad (2)$$

Equating equations (1) and (2), we arrive at:

$$\frac{B - Tr(d)}{N_s} \approx \frac{\sqrt{3}\,s}{R\sqrt{2p}} \quad (3)$$

By re-arranging equation (3) in terms of the bandwidth B, we identify the following estimate of the bandwidth B as:

$$B \approx Tr(d) + \frac{\sqrt{3}\,sN_s}{R\sqrt{2p}} \quad (4)$$

It is then assumed that the packet loss rate PLR(d) suffered by the first data stream is the same as that suffered by the $N_s$ competing TCP data streams (i.e. p=PLR(d)). This may be a particularly reasonable assumption if the first data stream is also a TCP data stream. Following this assumption, the packet loss rate p in equation (4) can be substituted with the measured packet loss rate PLR(d), leading to the following expression for the bandwidth B of link 114:

$$B \approx Tr(d) + \frac{\sqrt{3}\,s}{R\sqrt{2 \cdot PLR(d)}} \quad (5)$$

Equation (5) therefore estimates the bandwidth B as a function of the transmission rate Tr(d) of the first data stream and the packet loss rate PLR(d) associated with that transmission rate.

It is noted that the identified expression for the bandwidth as given by equation (5) is additionally a function of the parameters s, $N_s$ and R associated with the competing data streams. Though both the packet size s and round trip time R may be determined by either the source node 104 or the destination node 106, the number of competing data streams $N_s$ over the link 114 is likely to be unknown to the nodes 104 and 106.

However, it has been appreciated that by keeping the time between the transmission of the first set of data packets at the first transmission rate and the transmission of the second set of data packets at the second transmission rate sufficiently short, the number of competing data streams $N_s$ carried by the link 114 can be assumed constant. Thus, over a suitably short time duration, the value $$\frac{\sqrt{3}\,sN_s}{R\sqrt{2}}$$

in equation (5) can be assumed constant. Letting C be the constant $$C = \frac{\sqrt{3}\,sN_s}{R\sqrt{2}},$$

equation (5) can be re-written as:

$$B \approx Tr(d) + \frac{c}{\sqrt{PLR(d)}} \quad (6)$$

Thus, the bandwidth calculator 212 can calculate the bandwidth B by first forming a first expression of the bandwidth $B_{e1}$ in accordance with equation (6) as $$B_{e1} = Tr(1) + \frac{c}{\sqrt{PLR(1)}} \quad (7)$$

and a second expression of the bandwidth $$B_{e2} = Tr(2) + \frac{c}{\sqrt{PLR(2)}} \quad (8)$$

The bandwidth B of link 114 is also constant. The bandwidth calculator 212 can therefore equate the two bandwidth estimates $B_{e1}$ and $B_{e2}$ to determine the constant $$C = \frac{\sqrt{3}\,sN_s}{R\sqrt{2}}.$$

The bandwidth calculator can then calculate the bandwidth B by substituting the value of the constant C into the expression for $B_{e1}$ or $B_{e2}$.

The bandwidth calculator 212 can therefore determine the bandwidth of the link 114 independently of the number of competing data streams $N_s$. That is, the bandwidth calculator 212 can calculate the bandwidth B absent of the knowledge of the value of $N_s$ and without having to determine its value. This is because the set of transmission rates Tr(d) and associated packet loss rates PLR(d) for the first data stream are used to form a set of expressions for the bandwidth B that are used to eliminate the value of $N_s$, which is assumed constant over the duration that the set of transmission rates is used.

Alternatively, the bandwidth calculator 212 can eliminate the constant C, which depends upon the number of competing data streams Ns, from equations (7) and (8) for the two bandwidth estimates $B_{e1}$ or $B_{e2}$, and equate the two bandwidth estimates into a single bandwidth estimate $B_e$, resulting in:

$$(B_e - Tr(1))\sqrt{PLR(1)} = (B_e - Tr(2))\sqrt{PLR(2)} \quad (9)$$

Equation (9) can be rearranged to allow the single estimate $B_e$ to be determined as:

$$B_e = \frac{Tr(1)\sqrt{PLR(1)} - Tr(2)\sqrt{PLR(2)}}{\sqrt{PLR(1)} - \sqrt{PLR(2)}} \quad (10)$$

The above example illustrates how the bandwidth calculator 212 (and hence 312) can calculate the bandwidth B of link 114 ($B_e$) from two transmission rate values and two associated packet loss rates only. Thus, the bandwidth of the link can be considered to be a function of both the two transmission rate values and associated packet loss rates.

However, in certain circumstances it may be desirable for more than two transmission rates Tr(d) and associated packet loss rates PLR(d) to be used to calculate the bandwidth B. The use of more than two sets of measurements may be useful to generate a more accurate value of B in the presence of measurement errors in the packet loss rate and/or transmission rate.

In FIGS. 4, 408 to 416 described above may therefore be repeated until it is determined at 408 that a sufficient number of data packet sets have been considered. This sufficient number of data packet sets could be three or more, where each set of data packets forms part of the same data stream (referred to above as the 'first data stream'). In this case the bandwidth calculator can calculate the bandwidth of link 114 from the three or more transmission rates and the three or more associated packet loss rates. The bandwidth calculator could for example form a set of three or more expressions for the bandwidth, where each expression is a function of a respective transmission rate and associated packet loss rate.

Thus, in general the method of determining the bandwidth B may include transmitting a plurality of sets of data packets at respective transmission rates, and measuring an associated packet loss rate during the delivery of each of the plurality of sets of data packets. The bandwidth B may then be determined in dependence on all of the plurality of transmission rates and all of the associated packet loss rates.

The bandwidth calculator 212 (or 312) may identify a set of expressions for the bandwidth in accordance with equation (5), where each expression is a function of a respective transmission rate and associated measured packet loss rate. The bandwidth is then determined from the set of bandwidth expressions.

Mathematically, this may be expressed by saying that sets of data packets (forming part of the same data stream) may be transmitted at respective transmission rates Tr(d), and an associated packet loss rate PLR(d) for each transmission rate is measured, where d=1, 2, . . . η, and η≥2. The bandwidth calculator identifies a set of expressions for the bandwidth, $B_{ed}$, given by $$B_{ed} = Tr(d) + \frac{\sqrt{3} \, sN_s}{R\sqrt{2PLR(d)}} \quad (11)$$

where d=1, 2, . . . η.

The bandwidth B is then determined from the set of expressions.

In the case that η>2 (i.e. there are more than two transmission rates and associated packet loss rates), then the bandwidth calculator 212 may calculate the bandwidth using a method of least squares. The method of least squares may be used to solve the over-specified set of equations for the bandwidth, $B_{ed}$.

The above examples illustrate how a network node that transmits or receives data packets over a communication link carrying a plurality of data streams can estimate the bandwidth of that link. The bandwidth can be estimated by the node without the node knowing the number of data streams carried by the link.

Knowledge of the bandwidth B of the link 114 may be useful for controlling the transmission rate of the first data stream. For example, the transmission rate of the first data stream may be constrained to be less than a predetermined or specified amount of the determined bandwidth B. This may be useful to reserve a specified amount of the bandwidth over the link for other data streams, or for data streams supporting different applications.

If the bandwidth of the link is determined by the source node 104, then the source node may operate to control the transmission rate of the data packets forming the first stream so as to be no more than a specified amount of the determined bandwidth. For example, the bandwidth estimator 212, having determined the bandwidth, may communicate its value to the dispatch unit 208. The dispatch unit 208 may then use the received value of the bandwidth to control the transmission rate of the data packets from the node 104.

If the bandwidth B is instead determined by the destination node 106, then the destination node may communicate an indication of the bandwidth value to the source node 104 for controlling the transmission rate of the first data packets. The destination node 106 may in addition communicate an indication of a requested transmission rate of the data packets for the first data stream that is no more than a specified amount of the determined bandwidth.

The above examples have been described with reference to a source node and destination node. It will be appreciated that the source and destination node could be any suitable components configured to transmit and receive data packets over a network. The source node could for example be a content server configured to transmit data packets using adaptive bit rate delivery in accordance with a suitable protocol, such as an HTTP Adaptive Bit Rate Protocol (e.g. HTTP DASH; HTTP Live Streaming (HLS) etc.). The source node could for example be a Content Delivery Network (CDN) node, and the network 112 a Content Delivery Network. Alternatively, the source node could be some other type of server, such as a web server or a mail server. The destination node could be a device such as a computer; laptop, PC; mobile phone; smartphone; tablet; set-top box; smart TV; smart watch etc. Alternatively, the destination node could be some other type of device, such as a wireless access point or a router. It follows that the link for which the bandwidth is determined could be any suitable link forming part of a communication path between a source and destination of data through a network.

In the examples above, it is assumed that the majority of the traffic over the link 114 is TCP traffic. However, it will be appreciated that the data packets transmitted by, or received from, a node that is configured to calculate the bandwidth of the link (e.g. nodes 104 and 106) may not necessarily be TCP data packets, though they may be. That is, the 'first data stream' referred to above need not necessarily be a TCP data stream, but it could be.

The above examples are described with reference to a first set of data packets and a second set of data packets. It is to be understood that the first set of data packets need not be the first set of data packets communicated in a particular communication session. Rather, the terms "first" and "second" have been used as labels to identify different sets of data packets. In addition, the second set of data packets need not be contiguous with the first set of data packets, though they may be. There may for example be a set of one or more intermediary data packets transmitted from the source node between the first set of data packets and the second set of data packets.

Generally, any of the functions, methods, techniques or components described above for the components of the communication system can be implemented in software, firmware, hardware (e.g., fixed logic circuitry), or any combination thereof. The terms "unit", "detector" and "calculator" as used herein may generally represent software, firmware, hardware, or any combination thereof. In the case of a software implementation, the unit, detector and calculator represent computer program code or computer readable instructions that perform the specified tasks when executed on a processor. The algorithms and methods described herein could be performed by one or more processors executing code that causes the processor(s) to perform the algorithms/methods. The computer program code may be stored on a non-transitory computer-readable storage medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of determining a bandwidth of a link carrying a plurality of data streams between a plurality of sources and a plurality of destinations in a network, the method comprising:
sending data packets from a first data stream over the link from one source to one destination at a first transmission rate, and measuring an associated first packet loss rate;
determining whether a sufficient number of data packets have been considered to determine a bandwidth of the link;
when the sufficient number of data packets have not been considered:
incrementing a data packet set index, and
selecting a second transmission rate based on the data packet set index;
sending further data packets from the first data stream over the link from the one source to the one destination at the second transmission rate, wherein the second transmission rate is different than the first transmission rate, and measuring an associated second packet loss rate, wherein the associated first packet loss rate is independent of the associated second packet loss rate; and
determining the bandwidth of the link in dependence on the first packet loss rate, the second packet loss rate, the first transmission rate, the second transmission rate.

2. The method as claimed in claim 1, wherein the first data stream comprises a plurality of temporal segments, the data packets sent over the link at the first transmission rate are from a first temporal segment, and the data packets sent over the link at the second transmission rate are from a second temporal segment.

3. The method as claimed in claim 1, wherein determining the bandwidth of the link comprises:
identifying a first expression for the bandwidth as a function of the first transmission rate and associated first packet loss rate;
identifying a second expression for the bandwidth as a function of the second transmission rate and associated second packet loss rate; and
determining the bandwidth of the link from the first identified expression and the second identified expression.

4. The method as claimed in claim 3, wherein the first identified expression and the second identified expression of the bandwidths are further functions of a number of streams carried by the link.

5. The method as claimed in claim 3, wherein the first expression of the bandwidth, $B_{e1}$, is given by $$B_{e1} = Tr(1) + \frac{\sqrt{3}\, sN_s}{R\sqrt{2PLR(1)}},$$

and the second expression of the bandwidth, $B_{e2}$, is given by $$B_{e2} = Tr(2) + \frac{\sqrt{3}\, sN_s}{R\sqrt{2PLR(2)}},$$

where $Tr(1)$ is the first transmission rate, $Tr(2)$ is the second transmission rate, $PLR(1)$ is the first packet loss rate, $PLR(2)$ is the second packet loss rate, s is a size of a packet, $N_s$ is a number of competing streams carried by the link and R is a round trip time.

6. The method as claimed in claim 1, wherein the method further comprises controlling the transmission rate of the data packets of the first data stream to be no more than a specified amount of the determined bandwidth of the link.

7. The method as claimed in claim 1, wherein the bandwidth of the link is determined in dependence only on the first packet loss rate, the second packet loss rate, the first transmission rate and the second transmission rate.

8. The method as claimed in claim 1, wherein the method further comprises:
sending data packets from the first data stream over the link at three or more transmission rates, and measuring an associated packet loss rate for each of the three or more transmission rates; and
determining the bandwidth of the link in dependence on the three or more transmission rates and the associated packet loss rates.

9. The method as claimed in claim 8, wherein the bandwidth of the link is determined from the three or more transmission rates and the associated packet loss rates using a method of least squares applied to expressions of bandwidth.

10. The method as claimed in claim 1, wherein each of the plurality of data streams are TCP data streams.

11. The method as claimed in claim 1, further comprising:
further determining whether a sufficient number of data packets have been considered to determine the bandwidth of the link; and
when a sufficient number of data packets have not been considered based on the further determining:
further incrementing the data packet set index, and
selecting a further transmission rate based on the data packet set index,
wherein determining the bandwidth of the link is further in dependence on the further transmission rate and the further packet loss rate.

12. The method as claimed in claim 1, wherein the link carries a number of competing data streams, N, and the determining the bandwidth of the link is done without knowledge of N.

13. A source node configured to transmit a first data stream over a link to a destination node in a network, the link carrying a plurality of data streams, the source node comprising:
at least one processor and memory operably coupled to the at least one processor; and
instructions that, when executed on the at least one processor, cause the at least one processor to implement:
a dispatch unit configured to:
send data packets from the first data stream over the link at a first transmission rate,
when a sufficient number of data packets have not been considered to determine a bandwidth of the link:
increment a data packet set index, select a second transmission rate based on the data packet set index and send further data packets from the first data stream over the link at the second transmission rate, wherein the second transmission rate is different than the first transmission rate,
a packet loss detector configured to measure a first packet loss rate associated with the first transmission rate and a second packet loss rate associated with the second transmission, wherein the first packet loss rate is independent of the second packet loss rate, and a bandwidth calculator configured to:

determine whether the sufficient number of data packets have been considered to determine the bandwidth of the link, and determine a bandwidth of the link in dependence on the first packet loss rate, the second packet loss rate, the first transmission rate and the second transmission rate.

14. A destination node configured to receive a first data stream over a link from a source node in a network, the link carrying a plurality of data streams, the destination node comprising:

at least one processor and memory operably coupled to the at least one processor; and instructions that, when executed on the at least one processor, cause the at least one processor to implement:

an input interface configured to receive data packets from the first data stream over the link at a first transmission rate, and to receive further data packets from the first stream over the link at a second transmission rate, the second transmission rate based on a determination that a sufficient number of data packets have not been considered to determine a bandwidth of the link and subsequently incrementing a data packet set index and selecting the second transmission rate based on the data packet set index, wherein the second transmission rate is different than the first transmission rate, a packet loss detector configured to measure a first packet loss rate associated with the first transmission rate and a second packet loss rate associated with the second transmission rate, wherein the first packet loss rate is independent of the second packet loss rate, and a bandwidth calculator configured to:

determine whether the sufficient number of data packets have been considered to determine a bandwidth of the link, and determine the bandwidth of the link in dependence on the first packet loss rate, the second packet loss rate, the first transmission rate and the second transmission rate.

\* \* \* \* \*